United States Patent [19]

Inagaki et al.

[11] Patent Number: 5,183,733
[45] Date of Patent: Feb. 2, 1993

[54] SILVER HALIDE PHOTOGRAPHIC MATERIALS

[75] Inventors: Yoshio Inagaki; Tadashi Ikeda, both of Kanagawa, Japan

[73] Assignee: Fuji Photo Film Co., Ltd., Kanagawa, Japan

[21] Appl. No.: 723,154

[22] Filed: Jun. 28, 1991

[30] Foreign Application Priority Data

Jun. 29, 1990 [JP] Japan ................................ 2-172183

[51] Int. Cl.$^5$ .............................................. G03C 1/14
[52] U.S. Cl. ................................... 430/583; 430/584; 430/587; 430/588; 430/596
[58] Field of Search ............... 430/264, 583, 584, 587, 430/588, 596

[56] References Cited

U.S. PATENT DOCUMENTS 3,243,298  3/1966  Libeer et al. ..................... 430/587
3,706,570  12/1972  Nakazawa et al. ................ 430/583

OTHER PUBLICATIONS

Babichev, F. S.; Babicheva, A. F. Isoelectronic Analogs of Indoline. V. Derivatives of Pyrrolo [1,2-a] benzimidazole, Khim. Geterotsikl. Soedin. 1967, (5), 917–922, English translation.
Chemical Abstracts 69(16):60031v.

Primary Examiner—Charles L. Bowers, Jr.
Assistant Examiner—Janet C. Baxter
Attorney, Agent, or Firm—Sughrue, Mion, Zinn, Macpeak & Seas

[57] ABSTRACT

Disclosed are silver halide photographic materials, comprising a support having thereon a layer which contains a compound represented by the following general formula (I):

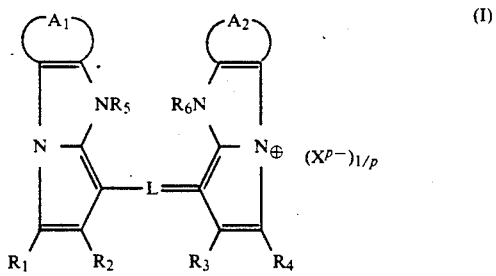

wherein $A_1$ and $A_2$ each represents groups of atoms which are required to complete aromatic rings, which may be substituted or unsubstituted; $R_1$, $R_2$, $R_3$ and $R_4$ each independently represents a hydrogen atom, an alkyl group, an alkenyl group, a phenyl group, a five- or six-membered heterocyclic group, an acyl group or an alkoxy group, which may be substituted or unsubstituted; $R_5$ and $R_6$ each independently represents an alkyl group, a phenyl group or a five- or six-membered heterocyclic group, which may be substituted or unsubstituted; X represents a p-valent anion; p represents 1, 2 or 3; L represents a methine group which may be substituted or unsubstituted, or a trivalent linking group wherein three, five or seven methine groups are linked by conjugated double bonds; and X may be bonded to $A_1$, $A_2$, $R_1$ to $R_6$ or L to form an intramolecular salt. These materials are spectrally sensitized action for light having a long wavelength, but the dyes of general formula (I) have comparatively short methine chains.

8 Claims, 1 Drawing Sheet

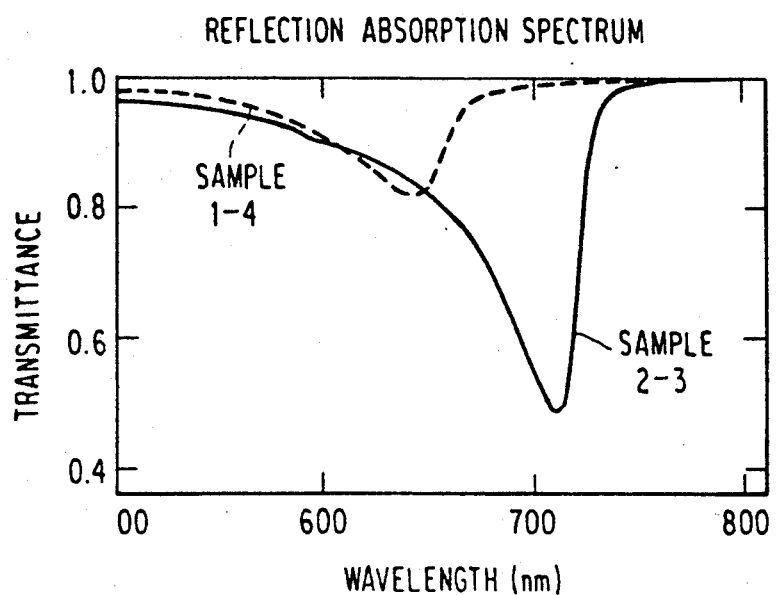
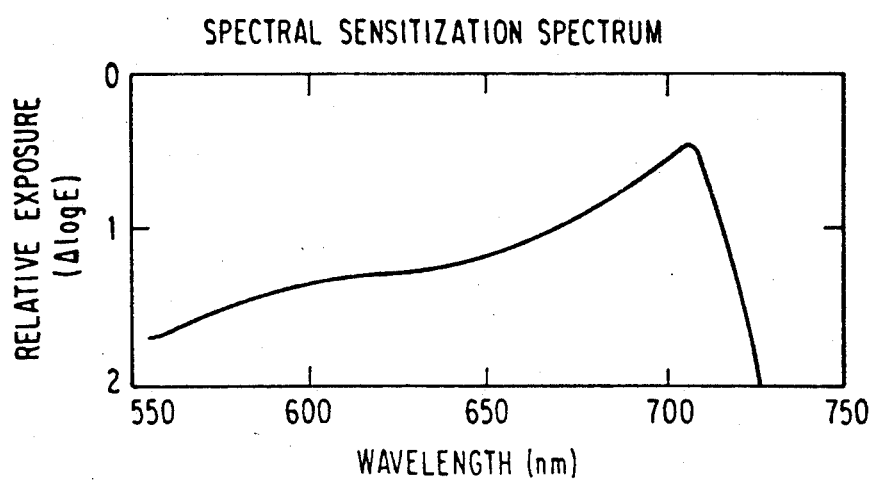

SILVER HALIDE PHOTOGRAPHIC MATERIALS

FIELD OF THE INVENTION

The present invention concerns silver halide photographic materials which contain cyanine dyes.

BACKGROUND OF THE INVENTION

Spectrally sensitizing dyes are used in silver halide photographic materials for the purpose of photosensitizing the material to light of a specific wavelength. Furthermore, dyes to provide shielding from light of specified wavelengths are also used. Many dyes of various structure which absorb visible light and which can be used for these purposes are known. However, in recent years semiconductor lasers which generate near infrared light are used as light sources and it has also been necessary to use dyes which absorb near infrared light in silver halide photographic materials.

Dyes which absorb near infrared light can be obtained by extending the conjugation system of dyes which absorb visible light. In particular, adsorption in the near infrared can be achieved by extending the length of the conjugated methine chain in cyanine dyes which can be used as photographically useful sensitizing dyes.

However, the weight which is added to the photographic material increases as a result of the increase in molecular weight of the dyes when the structure is modified in this way. This brings about undesirable effects such as that the formulation for the manufacture of the photographic materials is limited or that the weight of unwanted material, such as the dyes and their degradation products which are washed out from the photosensitive material during development and processing, is increased and this increases the burden on the effluent depolluting treatment systems.

On the other hand, it is known that the stability of a cyanine dye falls as the conjugated methine chain is extended.

Hence, dyes with which the absorption of light having a long wavelength, and especially light in the near infrared region, can be achieved with as short a conjugated methine chain length as possible are desired. However, to be useful as spectrally sensitizing dyes for photographic purposes, these dyes must exhibit an adequate spectral sensitivity in a photographic material, but this is not always the case in practice.

SUMMARY OF THE INVENTION

One object of the present invention is to provide novel silver halide photographic materials which contain cyanine dyes which have a spectral sensitizing action for light of a long wavelength even though the methine chain length is comparatively short.

The object of the invention has been realized by a silver halide photographic material which contains a compound represented by following general formula (I):

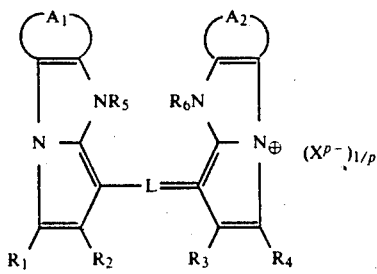

In this formula, $A_1$ and $A_2$ represent groups of atoms which are required to complete aromatic rings; $R_1$, $R_2$, $R_3$ and $R_4$ each independently represents a hydrogen atom, an alkyl group, an alkenyl group, a phenyl group, a five or six membered heterocyclic group, an acyl group or an alkoxy group, which may be substituted or unsubstituted; $R_5$ and $R_6$ each independently represents an alkyl group, a phenyl group or a five or six membered heterocyclic group, which may be substituted or unsubstituted; X represents a p-valent anion; p represents 1, 2 or 3; and L represents a methine group which may be substituted or unsubstituted, or a trivalent linking group wherein three, five or seven methine groups are linked by conjugated double bonds. Moreover, X may be bonded to $A_1$, $A_2$, $R_1$ to $R_6$ or L to form an intramolecular salt.

BRIEF DESCRIPTION OF THE DRAWINGS

FIG. 1 shows reflection adsorption spectra and
FIG. 2 shows a spectral sensitization distribution.

DETAILED DESCRIPTION OF THE INVENTION

The alkyl groups, alkenyl groups, phenyl groups, five or six membered heterocyclic groups, acyl groups and alkoxy groups aforementioned include those examples in which they are substituted with substituent groups.

The preferred aromatic rings which are completed by $A_1$ and $A_2$ are benzene rings and naphthalene rings, which may be substituted or unsubstituted, and the preferred substituent groups are halogen atoms such as F and Cl, cyano groups, nitro groups, carboxyl groups, sulfonic acid groups, acyl groups, alkylsulfonyl groups, arylsulfonyl groups, alkoxycarbonyl groups, acylamino groups, alkyl groups, aryl groups, alkoxy groups, aryloxy groups, alkylthio groups, arylthio groups, sulfamoyl groups or N-substituted sulfamoyl groups, and carbamoyl groups or N-substituted carbamoyl groups.

The alkenyl groups represented by $R_1$, $R_2$, $R_3$ and $R_4$ include a vinyl group, a 1-propenyl group and a 2-methylpropenyl group. The five or six-membered heterocyclic groups represented by $R_1$, $R_2$, $R_3$ and $R_4$ include an 1-imidazolyl group, a 1-pyrazolyl group, a 2-pyridyl group, a 1-pyrrolidyl group and a 4-pyridyl group. The acyl groups represented by $R_1$, $R_2$, $R_3$ and $R_4$ include an acethyl group and a benzoyl group. The alkoxy groups represented by $R_1$, $R_2$, $R_3$ and $R_4$ include a methoxy group, an ethoxy group, an isobutyl group and a 2-methoxyethoxy group.

The groups represented by $R_1$, $R_2$, $R_3$ and $R_4$ are preferably alkyl groups which have from 1 to 18, and more preferably from 1 to 4, carbon atoms and which may be substituted or unsubstituted (for example, methyl, ethyl, propyl, butyl, isobutyl, benzyl, 2-ethylhexyl, dodecyl, trifluoromethyl, 2-ethoxyethyl, 2- hydroxyethyl, 3-sulfopropyl, 3-sulfobutyl, 4-sulfobutyl, 2-sulfoethyl), phenyl groups having 6 to 18 carbon atoms or naphthyl groups having 10 to 18 carbon atoms, which may be substituted or unsubstituted (for example phenyl, 4-methylphenyl, 3,5-dichlorophenyl, 4-methoxyphenyl, β-naphthyl, 2,5-di-tert-amylphenyl).

The five or six-membered heterocyclic groups represented by $R_5$ and $R_6$ include a 4-pyrazolyl group, a 2-pyridyl group and a 4-pyridyl group.

The groups represented by $R_5$ and $R_6$ are preferably alkyl groups which have from 1 to 18, and more preferably from 1 to 8, carbon atoms and which may be substituted or unsubstituted (for example, methyl, ethyl, isopropyl, cyclohexyl, 2-ethylhexyl, benzyl, 2-phenylethyl, dodecyl, 2-ethoxyethyl, allyl, 2-methylthioethyl, 3-acetoxypropyl) or phenyl groups having 6 to 18 carbon atoms or naphthyl groups having from 10 to 18 carbon atoms, which may be substituted or unsubstituted (for example, phenyl, 4-methylphenyl, 3,5-dichlorophenyl, 4-methoxyphenyl, β-naphthyl, 2,5-di-tert-amylphenyl).

The preferred linking groups for L are those comprising three or five methine groups. The preferred substituent groups of these methine groups are halogen atoms and alkyl groups which have from 1 to 8 carbon atoms, and the most preferred substituent groups are alkyl groups which have from 1 to 4 carbon atoms, benzyl groups and phenyl groups.

Examples of divalent or trivalent anions represented by X include

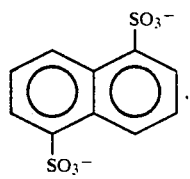

$SO_4^{2-}$, $HPO_4^{2-}$ and $PO_4^{3-}$.

The preferred anions represented by X are halide ions (for example, $Cl^-$, $Br^-$, $I^-$), sulfonate ions (for example, $CH_3SO_3^-$, $CF_3SO_3^-$, $CH_3OSO_3^-$,

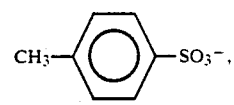

naphthalene-1,5-disulfonate ion), $ClO_4^-$, $BF_4^-$ and phosphate ions (for example

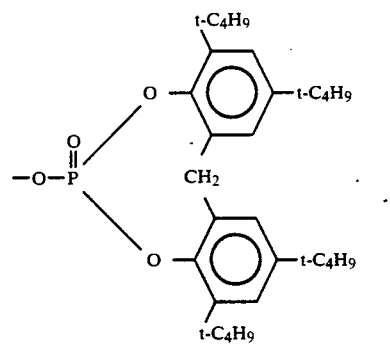

The halide ions and sulfonate ions are the most preferred anions.

In those cases where a compound represented by general formula (I) of the present invention is combined with a negative emulsion, the substituent groups on $R_1$ to $R_4$, $A_1$ and $A_2$ are preferably groups which have comparatively weak electron withdrawing properties. Such substituents have a Hammett σ-value of not more than +0.6, and preferably not more than 0. On the other hand, in those cases where a compound represented by general formula (I) is combined with an emulsion which has pre-fogged nuclei, the substituent groups on $R_1$ to $R_4$, $A_1$ and $A_2$ are preferably groups which have comparatively strong electron withdrawing properties, and substituent groups of which the Hammett σ-value has a value higher than +0.6 are preferred.

Examples of above mentioned compounds which can be represented by general formula (I) are shown below, but the scope of the present invention is not limited to these compounds.

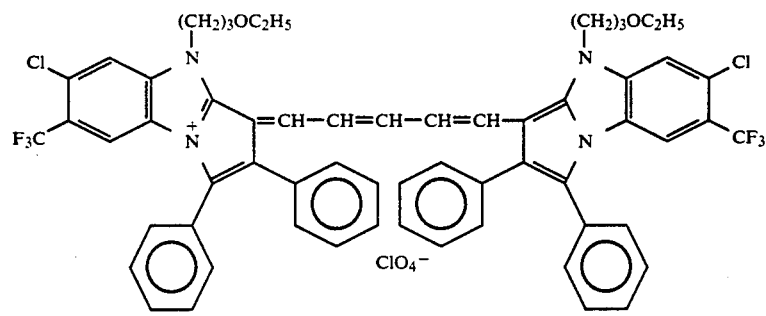

I-1

-continued
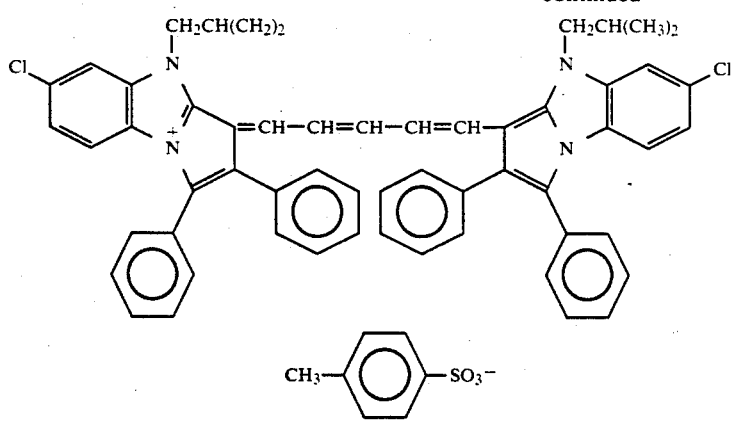
I-2
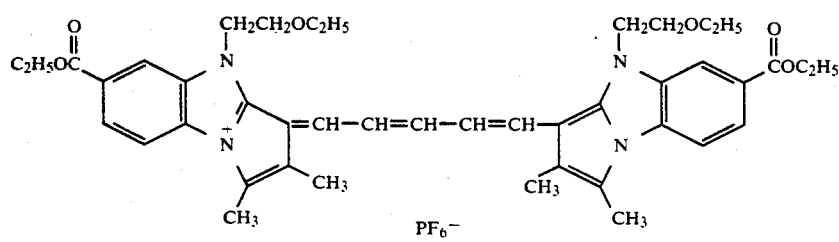
I-3
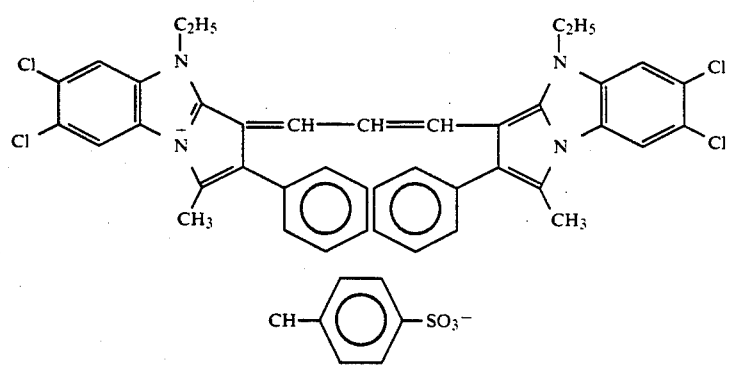
I-4
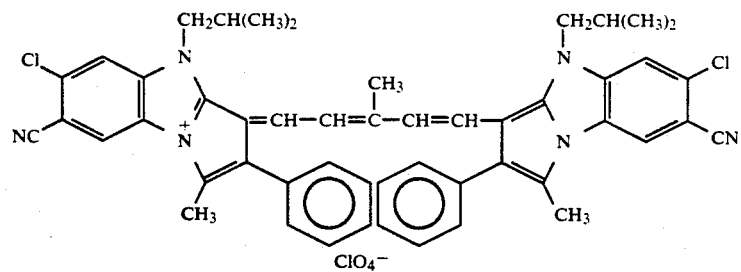
I-5
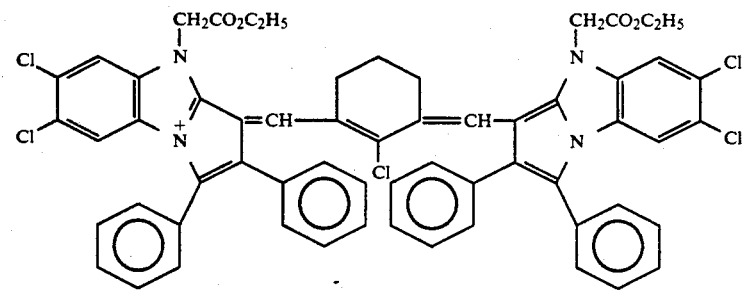
I-6

-continued
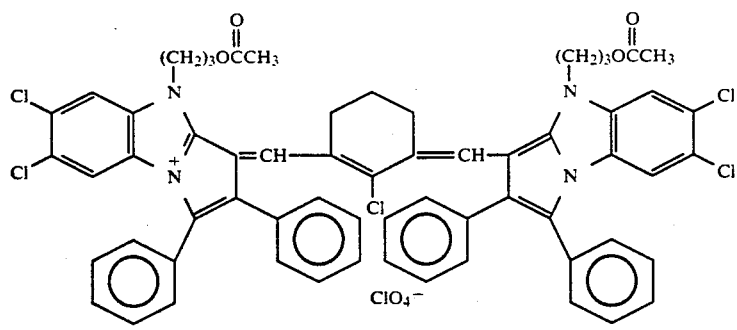
I-7
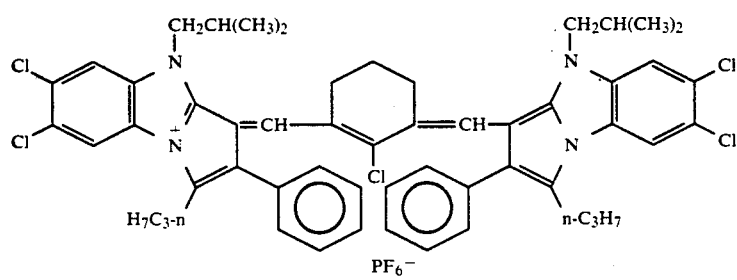
I-8
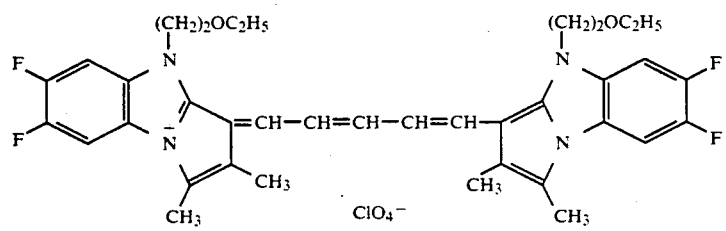
I-9
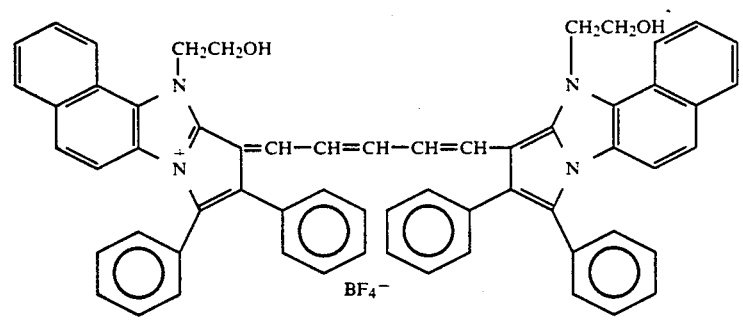
I-10
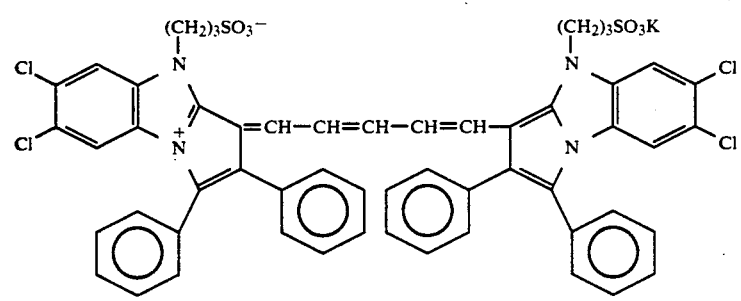
I-11

-continued
I-12
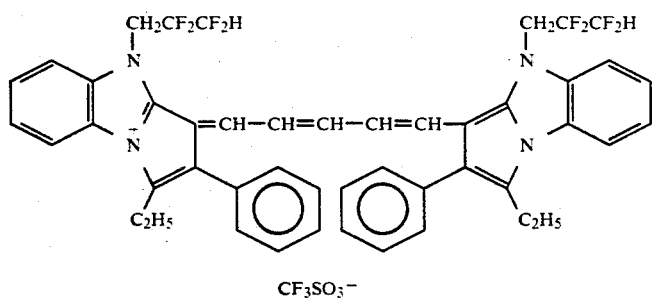
I-13
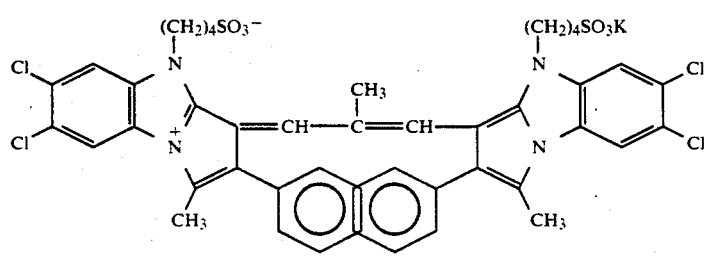
I-14
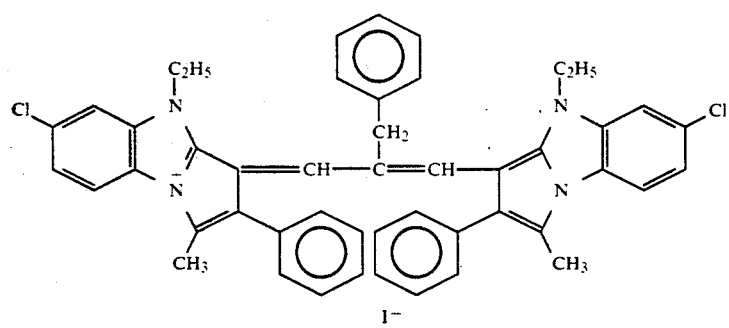
I-15
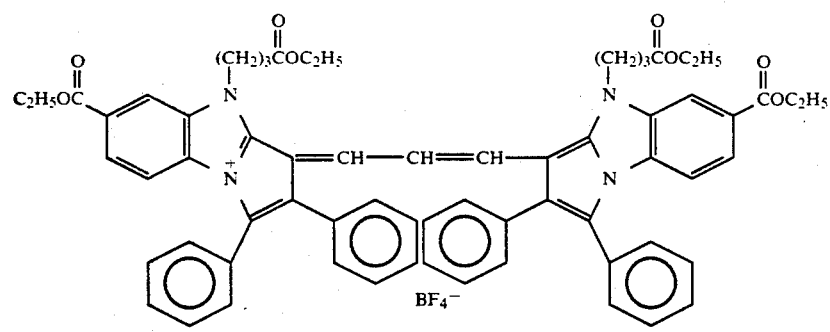
I-16
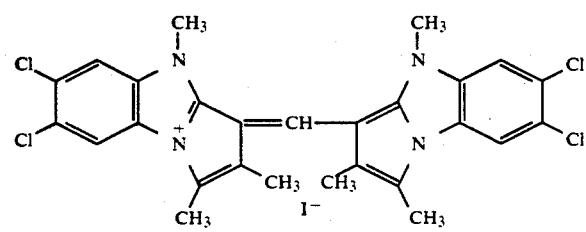

-continued
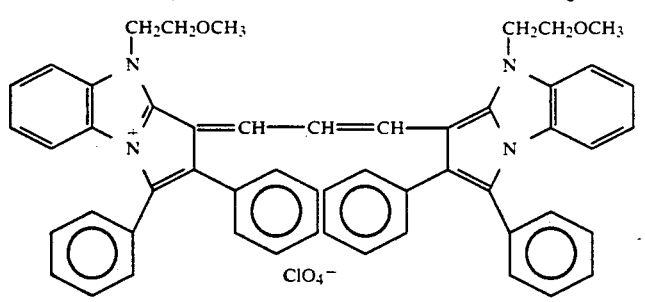 I-17
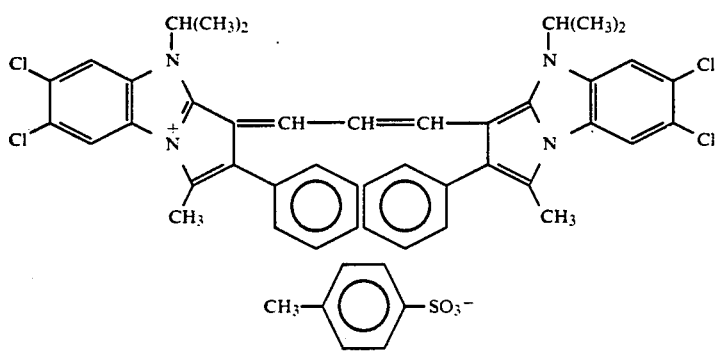 I-18
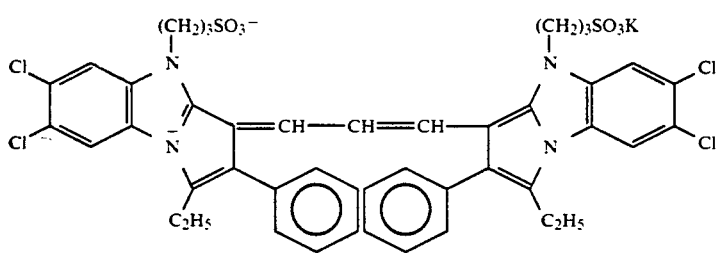 I-19
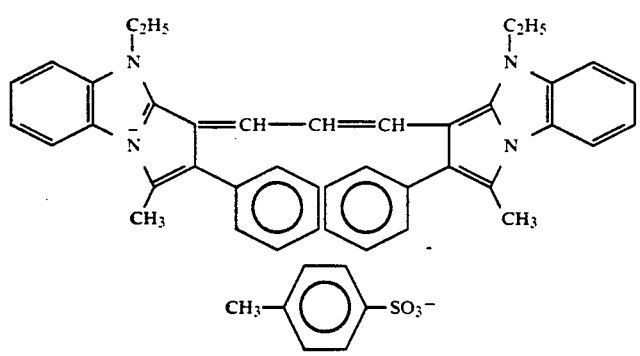 I-20
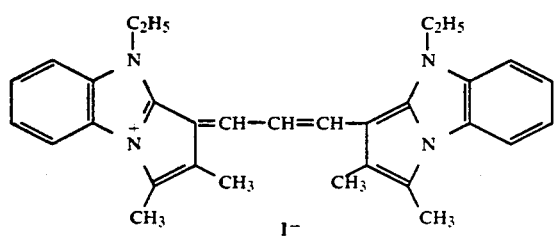 I-21

-continued
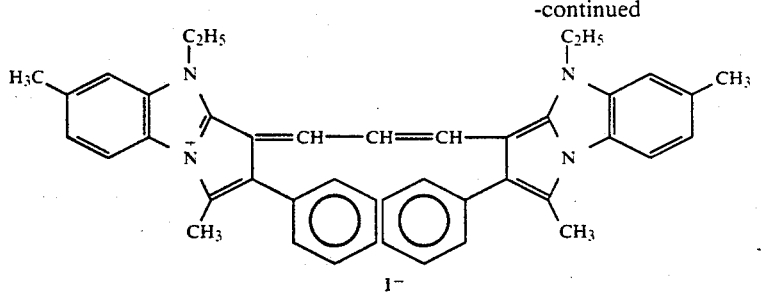
I-22
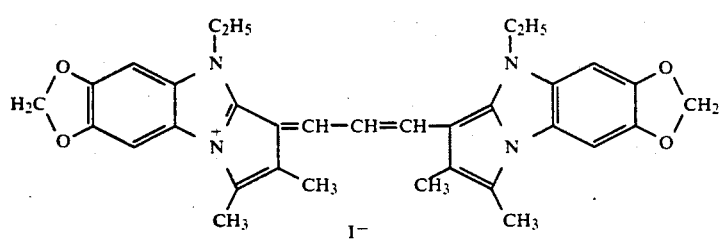
I-23
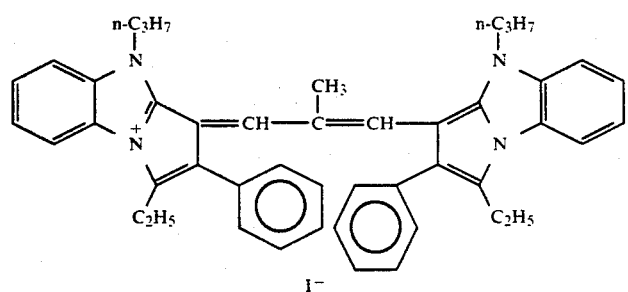
I-24
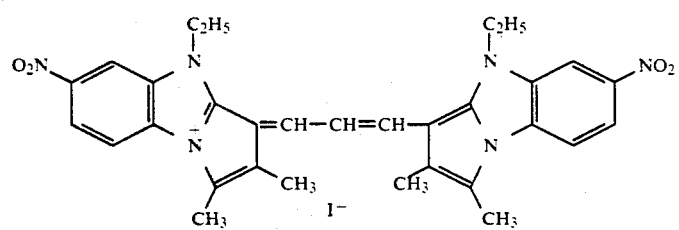
I-25
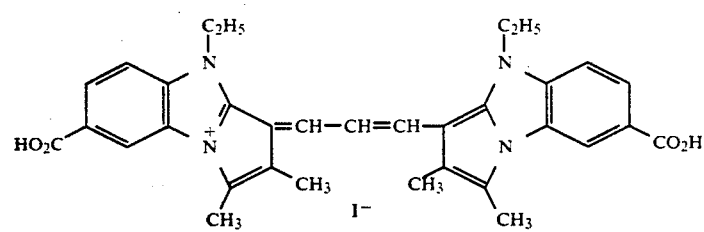
I-26
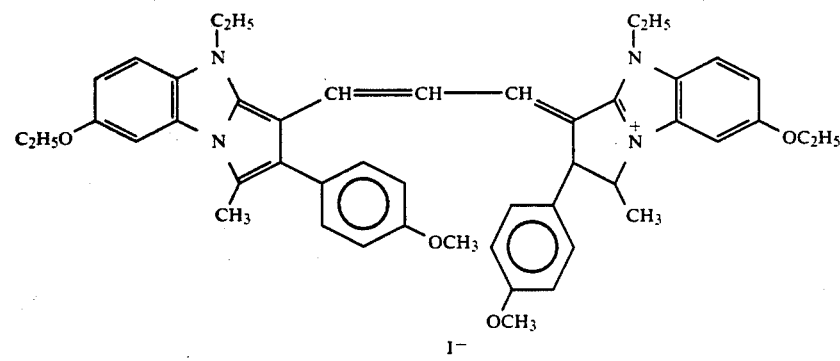
I-27

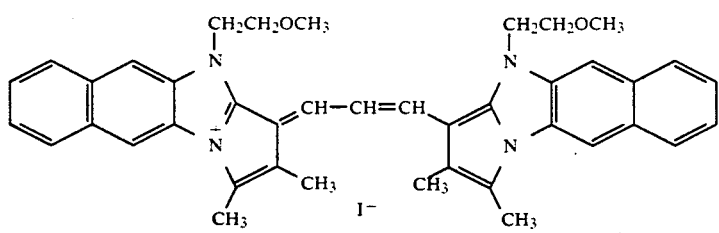
I-28
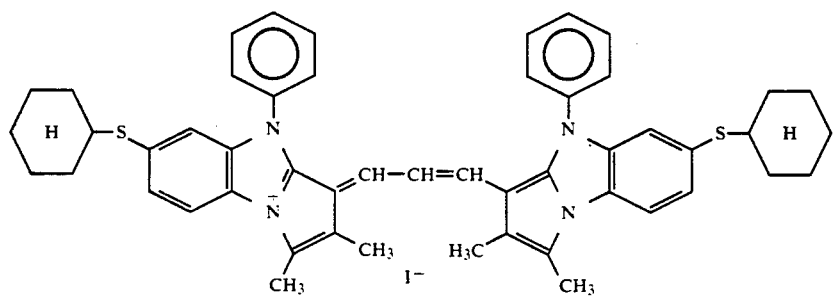
I-29
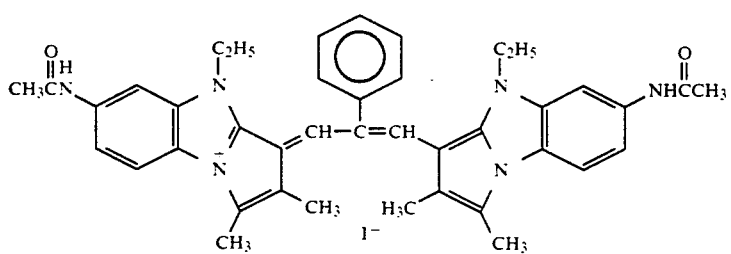
I-30
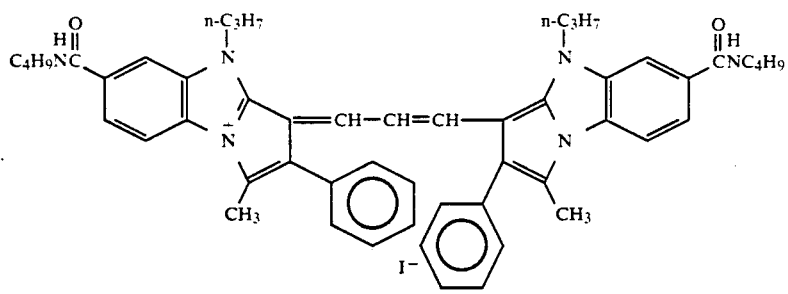
I-31
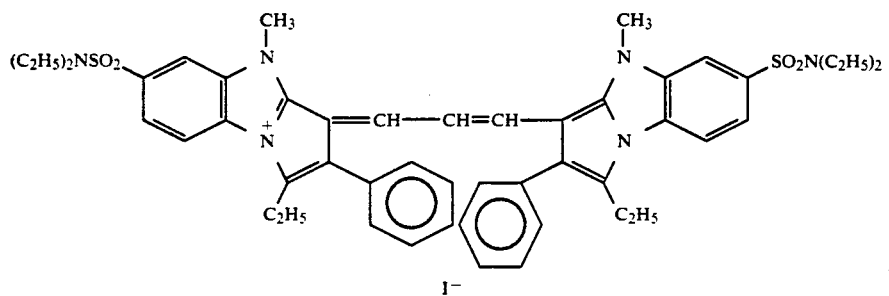
I-32

-continued
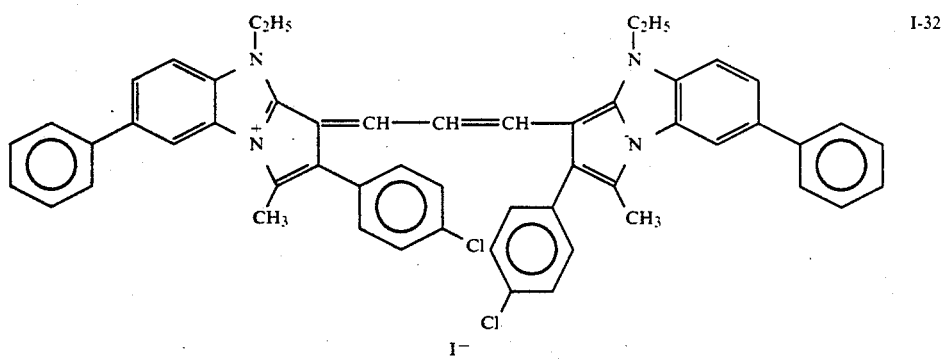
I-32
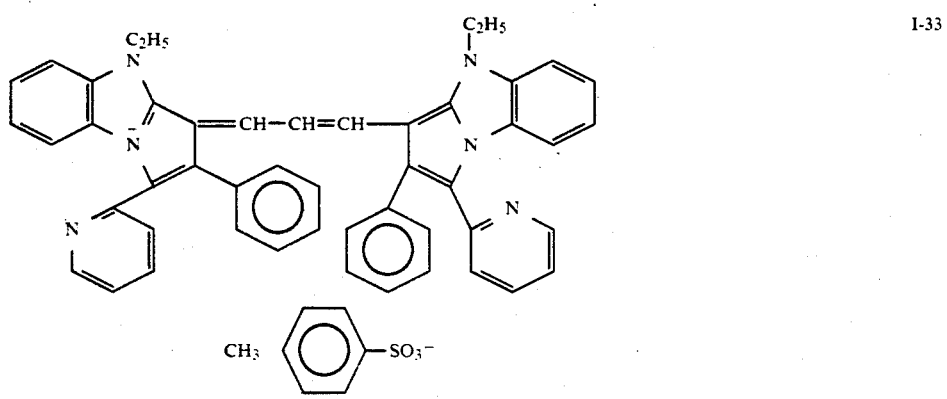
I-33
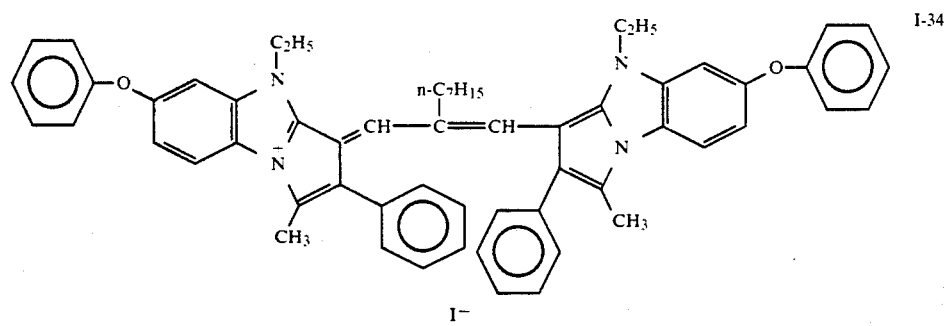
I-34
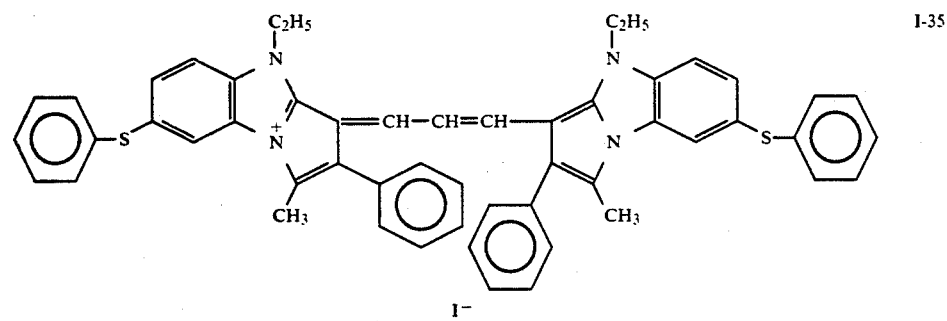
I-35

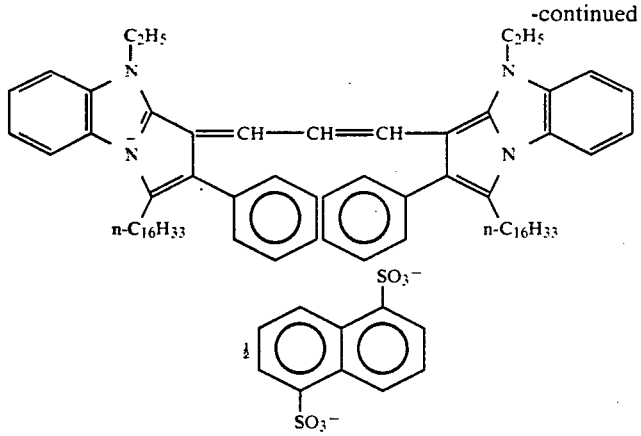

I-36

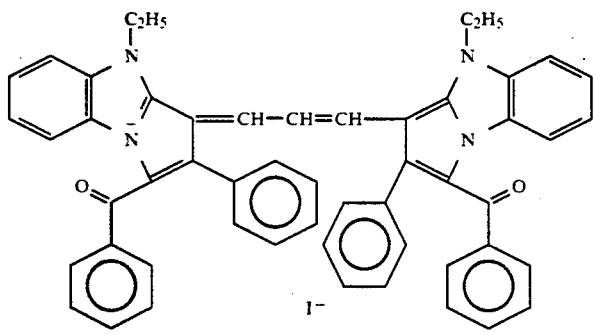

I-37

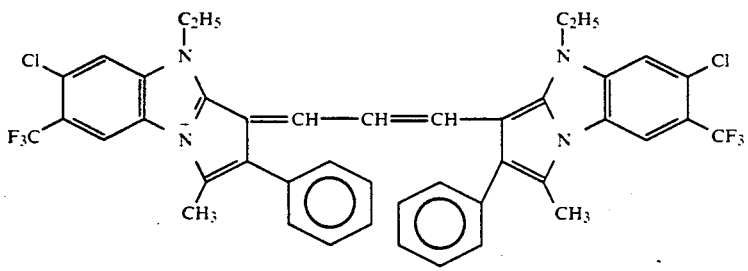

I-38

Compounds which can be represented by general formula (I) of the present invention can be prepared by methods similar to those in the report by Babichev and Babicheva in *Khim. Geterotsikl. Soedin*, 1967, No. 5, pages 917–922 of which an abstract appears in *Chemical Abstracts*, Vol. 69, page 5625, abstract number 60031V.

Examples of the methods for preparation of the compounds which can be represented by general formula (I) of the present invention are described below.

SYNTHESIS EXAMPLE 1: PREPARATION OF COMPOUND 4

Acetone (25 ml) was added to 4.58 grams of 5,6-dichloro-1-ethyl-2-methylbenzimidazole and, after forming a solution, 3 ml of α-bromopropiophenone was added thereto and the resulting mixture was heated under reflux for 100 minutes.

After removing the acetone, the mixture was heated to 100° C. for 1 hour. Acetone (100 ml) was then added to the reaction mixture, the mixture was stirred, and the colorless crystals which formed were removed by filtration, washed with acetone and dried. Recovery was 5.4 grams.

These crystals were added to an aqueous solution prepared using 1.3 grams of sodium carbonate and 60 ml of water and the mixture was heated in a steam bath for 80 minutes.

After cooling, the crystals which had been formed were recovered by filtration, washed with water, and 4.8 grams of colorless crystals were obtained. These crystals were recrystallized from 600 ml of methanol, and 2 grams of 6,7-dichloro-4-ethyl-1-methyl-2-phenyl-pyrrolo(1,2-a)benzimidazole was obtained in the form of colorless needle-shaped crystals.

Acetonitrile (20 ml) and 0.3 gram of p-toluenesulfonic acid, mono-hydrate, were added to 1 gram of these crystals and a solution was obtained. After which, 1 ml of 1,3,3-trimethoxypropene was added and the mixture was heated under reflux for 5 minutes. After cooling, the crystals which had been formed were recovered by filtration, washed with 25 ml of acetonitrile and 0.75 grams of the crystalline compound was obtained. The melting point was 247°–249° C.

SYNTHESIS EXAMPLE 2: PREPARATION OF COMPOUND 18

α-Bromopropiophenone (1.52 ml) and 1 ml of anisole were added to 2.57 grams of 5,6-dichloro-1-isopropyl-2-methylbenzimidazole and, after heating for 2 hours on a steam bath, 50 ml of acetone was added. The crystals which were produced were recovered by filtration, 40 ml of a 2% aqueous sodium carbonate solution was added and the mixture was heated for 80 minutes on a steam bath. After cooling, the crystals which had been formed were recovered by crystallization, washed with water and 6,7-dichloro-4-isopropyl-1-methyl-2-phenyl-pyrrolo(1,2-a)benzimidazole was obtained.

Acetonitrile (11 ml), 0.17 gram of p-toluenesulfonic acid, mono-hydrate, and 0.6 ml of 1,3,3-trimethoxypropene were added to 0.6 gram of these crystals and the mixture was heated under reflux for 15 minutes. After cooling, the crystals which had been formed were recovered by filtration, washed with a small quantity of acetonitrile and 0.2 gram of the compound was obtained. Melting Point 167° C.

The cyanine dyes represented by general formula (I) of the present invention can be added in an emulsion layer for the purpose of providing spectral sensitization. Furthermore, they can be also added as dyes in other hydrophilic colloid layers.

The stage at which the above cyanine dyes are added to a silver halide emulsion of the present invention may be any of the process stages for the manufacture of emulsions which are known to be suitable for other dyes. For example, they may be added during the formation of the grains, before de-salting or/and during the de-salting process, as disclosed, for example, in U.S. Pat. Nos. 2,735,766, 3,628,960, 4,183,756 and 4,225,666, JP-A-58-184142 and JP-A-60-196749; immediately before or during the process of chemical ripening, as disclosed, for example, in JP-A-58-113920; during the interval after chemical ripening up to the time of coating, and at any stage before or during the process of coating the emulsion. (The term "JP-A" as used herein signifies an "unexamined published Japanese patent application".)

Furthermore, a compound of one structure alone, or combinations of compounds which have different structures, may be added in parts. For example, part may be added during the grain forming process and part may be added during the chemical ripening process or after the completion of chemical ripening, or part may be added before or during the process of chemical ripening and part may be added after completion of chemical ripening, as disclosed in U.S. Patent 4,225,666 and JP-A-58-7629. The type of compound and the time of combination of compounds which are added separately can be varied as the addition is being made.

The amount of the novel cyanine dye represented by general formula (I) used in the present invention varies according to the shape and size of the silver halide grains, but it is preferably from $1 \times 10^{-6}$ to $1 \times 10^{-3}$ mol, more preferably from $1 \times 10^{-5}$ to $5 \times 10^{-4}$ mol, per mol of silver halide. In the case of M-band type spectral sensitization, the amount added is most desirably not more than 40% of the amount which must be added to realize saturation coverage (The lower limit is 0.5%.), and in those cases where J-aggregates are formed and J-band type spectral sensitization is involved the amount added is preferably from 25% to 80% of the saturation coverage.

The condition for preparing the emulsions having J-band type spectral sensitization is preferably set so that the cyanine dyes of the present invention are added in an amount of from $2 \times 10^{-5}$ to $5 \times 10^{-4}$ mol/mole of Ag (comparatively large amount) and the emulsions are prepared at a temperature of 50 to 70° C. (comparatively high temperature), though it depends on the structure of the cyanine dyes.

When the novel cyanine dyes of the present invention are added to a silver halide emulsion, they may be combined with compounds which are strongly adsorbed on the silver halide grains and bring about super-sensitization. Many such compounds are known, including, for example, water soluble bromides, water soluble iodides, the bispyridinum salts disclosed in JP-A-59-142541, the mercapto group substituted azole compounds disclosed in JP-A-64-13539 and JP-A-1-163732, the bisaminostilbene polysulfonic acid derivatives disclosed in JP-A-1-97947 and the condensates of aromatic compounds which have hydroxy groups and formaldehyde disclosed in U.S. Pat. No. 3,743,510. In the present invention, the aforementioned bisaminostilbene polysulfonic acid derivatives are especially desirable in those cases in which M-band type spectral sensitization is prescribed.

The novel cyanine dyes of the present invention may be dispersed directly in the emulsion or they may be dissolved in an individual solvent such as water, acetone, methanol, ethanol, propanol, tetrahydrofuran, methylcellosolve, 2,2,3,3-tetrafluoropropanol or N,N-dimethylformamide or in a mixture of such solvents and the solution so obtained may be added to the emulsion. Ultrasonics can also be employed for dissolution purposes.

Furthermore, other methods for the addition of the cyanine dyes include: the methods in which the dye is dissolved in a volatile organic solvent, the resulting solution is dispersed in water or in a hydrophilic colloid and the dispersion is added to the emulsion as disclosed, for example, in U.S. Pat. No. 3,469,987; the methods in which water insoluble dyes are dispersed in a water soluble solvent in which the dye is insoluble and this dispersion is added to the emulsion, as disclosed in JP-B-46-24185; the methods in which the dye is dissolved in an acid and the resulting solution is added to the emulsion or in which an aqueous solution is prepared with acid or base and the solution is added to the emulsion as disclosed, for example, in JP-B-44-23389, JP-B-44-27555 and JP-B-57-22091; the methods in which the dye is part of an aqueous or colloidal dispersion together with a surfactant and this dispersion is added to the emulsion as disclosed, for example, in U.S. Pat. Nos. 3,822,135 and 4,006,025; the methods in which the dye is dispersed directly in a hydrophilic colloid and the dispersion is added to the emulsion as disclosed in JP-A-53-102733 and JP-A-58-105141; and the methods in which a red shifted compound is used to form a solution which is then added to the emulsion as disclosed in JP-A-51-74624. (The term "JP-B" as used herein signifies an "examined Japanese patent publication".)

The silver halide emulsions used in the present invention are generally prepared by mixing a solution of a water soluble silver salt (for example silver nitrate) and a solution of a water soluble halogen salt (for example potassium bromide) with a solution of a water soluble macromolecular substance such as gelatin. In addition to silver chloride and silver bromide, mixed silver halides such as silver chlorobromide, silver iodobromide and silver chloroiodobromide for example, can be used as the silver halide. Among them, silver chloride, silver chlorobromide, and silver bromide are preferable. The average grain size of the silver halide grains (represented by the average of the diameters of the grains in those cases where the grains are spherical or approximately spherical and the edge length in the case of cubic grains, being based upon the projected areas) is preferably not more than 2 $\mu$, but it is most preferably not more than 0.4 $\mu$. The grain size distribution may be narrow or wide.

The silver halide grains may have a cubic crystalline form, octahedral or tabular form as disclosed, for example, in JP-A-58-127921 and JP-A-58-113926.

Furthermore, two or more silver halide emulsions which have been formed separately may be mixed together. Moreover, the crystal structure of the silver halide grains may be uniform right into the interior, or the grains may have a layer structure in which the interior and exterior parts are different, or the grains may be of the so-called convergence type such as those disclosed in British Patent 635,841 or U.S. Pat. No. 3,622,318. Furthermore, they may be of the type in which the latent image is formed principally on the surface or of the type with which the latent image is formed principally within the grains.

Cadmium salts, zinc salts, lead salts, thallium salts, iridium salts or complex salts thereof, rhodium salts or complex salts thereof, and iron salts or complex salts thereof, for example, may be present during the formation or physical ripening processes of the silver halide grains.

The silver halide emulsion used may be a so-called primitive emulsion which has not been subjected to chemical sensitization, but generally the emulsions are chemically sensitized. Sulfur sensitization methods in which active gelatin or compounds which contain sulfur which can react with silver (for example thiosulfate, thioureas, mercapto compounds and rhodanines) are used, reduction sensitization methods in which reducing substances (for example, stannous salts, amines, hydrazine derivatives, formamidine sulfinic acid and silane compounds) are used, and precious metal sensitization method in which precious metal compounds (for example gold compounds and complex salts of metals of group VIII of the periodic Table such as platinum, iridium and palladium for example) are used, can be used either individually or in combination.

Gelatin is useful as a binding agent or protective colloid which can be used in the emulsion layers and intermediate layers of a photosensitive material of the present invention, but other hydrophilic colloids can also be used.

For example, use can be made of gelatin derivatives, graft polymers of gelatin and other macromolecules, proteins such as albumin and casein, cellulose derivatives such as hydroxyethylcellulose, carboxymethylcellulose and cellulose sulfate esters, sugar derivatives such as starch derivatives and sodium alginate, and various synthetic macromolecular materials including homopolymers such as poly(vinyl alcohol), partially acetalated poly(vinyl alcohol), poly(N-vinylpyrrolidone), poly(acrylic acid), poly(methacrylic acid), polyacrylamide, polyvinylimidazole and polyvinylpyrazole, and copolymers of these materials.

The acid treated gelatins and enzyme treated gelatins can be used for the gelatin as well as lime treated gelatins, gelatin hydrolyzates and enzyme degradation products of gelatin.

Inorganic or organic film hardening agents may be included in the photographic emulsion layers and other hydrophilic colloid layers in a photographic material of the present invention. For example, chromium salts (for example, chrome alum, chromium acetate), aldehydes (for example, formaldehyde, glyoxal, glutaraldehyde), N-methylol compounds (for example, dimethylolurea, methyloldimethylhydantoin), dioxane derivatives (for example, 2,3-dihydroxydioxane), active vinyl compounds (for example, 1,3,5-triacryloyl-hexahydro-s-triazine, 1,3-vinylsulfonyl-2-propanol), active halogen compounds (for example, 2,4-dichloro-6-hydroxy-s-triazine) and mucohalogen acids (for example, mucochloric acid, mucophenoxychloric acid), can be used either individually or in combination.

From among these compounds, active vinyl compounds or active halogen compounds are preferred.

Various surfactants may be included for various purposes in the photographic emulsion layers or other hydrophilic colloid layers of a photosensitive material prepared according to the present invention, for example as coating promoters, for anti-static purposes, for improving slip properties, for emulsification and dispersion purposes, for preventing sticking or for improving photographic performance (for example, for accelerating development, increasing contrast or for increasing sensitivity).

For example, non-ionic surfactants, such as saponin (steroid based), alkylene oxide derivatives (for example, polyethylene glycol, polyethylene glycol/polypropylene glycol condensate, polyethylene glycol alkyl ethers or polyethylene glycol aryl alkyl ethers, polyethylene glycol esters, polyethylene glycol sorbitan esters, polyalkylene glycol alkyl amines or amides and poly(ethylene oxide) adducts of silicones), glycidol derivatives (for example, alkenyl succinic acid polyglyceride, alkylphenol polyglyceride), fatty acid esters of polyhydric alcohols and the alkyl esters of sugars; anionic surfactants such as those which contain an acidic group such as a carboxy group, a sulfo group, a phospho group, a sulfate ester group or a phosphate ester group, for example alkylcarboxylates, alklysulfonates, alkylbenzenesulfonates, alkylnaphthalenesulfonates, alkylsulfateesters, alkylphosphate esters, N-acyl-N-alkyltaurines, sulfosuccinate esters, sulfoalkylpolyoxyethylene alkylphenyl ethers and polyoxyethylene alkyl phosphate esters; amphoteric surfactants, such as amino acids, aminoalkylsulfonic acids, aminoalkylsulfate or phosphate esters, alkylbetaines and amine oxides; and cationic surfactants such as alkylamine salts, aliphatic and aromatic quaternary ammonium salts, heterocyclic quaternary ammonium salts such as pyridinium salts and imidazolium salts, and phosphonium or sulfonium salts which contain aliphatic or heterocyclic rings. The use of fluorine containing surfactants as anti-static agents is especially desirable.

The emulsions of the present invention may be spectrally sensitized by the dyes of grneral formula (I) in combination with other methine dyes. The dyes which can be used include cyanine dyes, merocyanine dyes, complex cyanine dyes, complex merocyanine dyes, holopolar cyanine dyes, hemi-cyanine dyes, styryl dyes and hemi-oxonol dyes. Dyes classified as cyanine dyes, merocyanine dyes and complex merocyanine dyes are especially useful. All of the nuclei generally used in cyanine dyes can be used for the basic heterocyclic nuclei of these dyes. That is to say, the nucleus may be a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus or a pyridine nucleus. It may be a nucleus in which one of these nuclei is fused with an aliphatic hydrocarbyl ring, or a nucleus in which one of these nuclei is fused with an aromatic hydrocarbyl ring, which is to say an indolenine nucleus, a benzindolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus or a quinoline nucleus, for example. These nuclei may be substituted on the carbon atoms.

The nuclei which have a ketomethylene structure in the merocyanine dyes or complex merocyanine dyes may be five- or six-membered heterocyclic nuclei, for example a pyrazolin-5-one nucleus, a thiohydantoin nucleus, a 2-thio-oxazolidin-2,4-dione nucleus, a thiazolidin-2,4-dione nucleus, a rhodanine nucleus or a thiobarbituric acid nucleus. A combination of sensitizing dyes is often used to achieve super-sensitization.

Poly(alkylene oxides) or derivatives such as their ethers, esters and amines for example, thioether compounds, thiomorpholines, quaternary ammonium salt compounds, urethane derivatives, urea derivatives, imidazole derivatives and 3-pyrazolidones, for example, may be included in a photographic emulsion layer of the photographic material of the present invention to increase photographic speed, increase contrast or accelerate development.

Dispersions of water insoluble or sparingly soluble synthetic polymers can be included in a photographic emulsion layer or other hydrophilic colloid layer in a photosensitive material of this invention with a view to improving the dimensional stability. For example, polymers in which alkyl (meth)acrylate, glycidyl (meth)acrylate either alone or in combination, or combinations of these monomers with acrylic acid and methacrylic acid for example, form the monomer components, can be used.

Water soluble dyes can be included in a hydrophilic colloid layer in the photosensitive material according to the present invention as filter dyes, for anti-irradiation purposes or for various other purposes. Such dyes include oxonol dyes, hemi-oxonol dyes, styryl dyes, merocyanine dyes, cyanine dyes and azo dyes. The oxonol dyes, hemi-oxonol dyes and merocyanine dyes are useful from among these dyes.

Various compounds other than the compounds of general formula (I) can be used conjointly in the photographic emulsions of the present invention with a view to preventing the occurrence of fogging during the manufacture, storage or photographic processing of the photosensitive material or with a view to stabilizing photographic performance. Thus, many compounds which are known as anti-foggants or stabilizers, such as azoles {for example, benzothiazolium salts, nitroimidazoles, nitrobenzimidazoles, chlorobenzimidazoles, bromobenzimidazoles, nitroindazoles, benzotriazoles and aminotriazoles}; mercapto compounds {for example, mercaptothiazoles, mercaptobenzothiazoles, mercaptobenzimidazoles, mercaptothiadiazoles, mercaptotetrazoles (especially 1-phenyl-5-mercaptotetrazole), mercaptopyrimidines and mercaptotriazines}; thioketo compounds (for example, oxazolinethione); azaindenes {for example, triazaindenes, tetra-azaindenes (especially 4-hydroxy substituted(1,3,3a,7)-tetra-azaindenes) and penta-azaindenes}; benzenethiosulfonic acid, benzenesulfinic acid and benzenesulfonic acid amide, can be added for this purpose.

Dye forming couplers, which is to say compounds which can form colors by way of an oxidative coupling reaction with a primary aromatic amine developing agent (for example, a phenylenediamine derivative or an aminophenol derivative) in the course of color development processing may be included in a photographic material of the present invention. Couplers which are fast to diffusion, having hydrophobic groups known as ballast groups within the molecule, or polymerized couplers, are preferred. The couplers may be four-equivalent or two-equivalent with respect to silver ion. Furthermore, colored couplers which have a color correcting effect, or couplers which release development inhibitors as development proceeds (so-called DIR couplers); may be included. Furthermore, non-color forming DIR coupling compounds for which the products of the coupling reaction are colorless but which release a development inhibitor may also be included.

For example, there are 5-pyrazolone couplers, pyrazolobenzimidazole couplers, cyanoacetylcoumarone couplers and open chain acylacetonitrile couplers among the magenta couplers, acylacetamide couplers (for example, benzoylacetamide and pivaloylacetanilides) among the yellow couplers, and naphthol couplers and phenol couplers among the cyan couplers.

Two or more of the above mentioned couplers may be used in the same layer in order to satisfy the characteristics required of the photosensitive material, and the same compound can also be included in two or more different layers.

The known methods, for example the methods disclosed in U.S. Pat. No. 2,322,027, can be used to introduce the couplers into a silver halide emulsion layer. For example, the couplers may be dissolved in an alkyl ester of phthalic acid (for example dibutyl phthalate, dioctyl phthalate), a phosphoric acid ester (for example, diphenyl phosphate, triphenyl phosphate, tricresyl phosphate, dioctyl butyl phosphate), a citric acid ester (for example tributyl acetylcitrate), a benzoic acid ester (for example octyl benzoate), an alkylamide (for example diethyllaurylamide), a fatty acid ester (for example, dibutoxyethyl salicylate, diethyl azelate) or a trimesic acid ester (for example tributyl trimesate), or an organic solvent having boiling point from about 30° C. to 150° C., for example a lower alkyl acetate such as ethyl acetate, ethyl propionate, secondary butyl alcohol, methyl isobutyl ketone, $\beta$-ethoxyethyl acetate, or methylcellosolve acetate. Then the solution may be dispersed in a hydrophilic colloid. The above mentioned high boiling point solvents and low boiling point solvents may be used in the form of mixtures.

Furthermore, methods of dispersion of couplers with polymers as disclosed in JP-B-51-39853 and JP-A-51-59943 can also be used.

In those cases where the coupler has acid groups such as carboxylic acid or sulfonic acid groups, it can be introduced into a hydrophilic colloid as a solution with an aqueous alkali. This is disclosed on JP-B-43-7561.

Known discoloration inhibitors can also be used in the photographic material of the present invention. Known discoloration inhibitors include hydroquinone derivatives, gallic acid derivatives, p-alkoxyphenols, p-oxyphenol derivatives and bisphenols, for example.

The various additives mentioned earlier can be used in a photosensitive material of the present invention, but other additives can also be used for various purposes.

These additives have been disclosed in detail in *Research Disclosure*, item 307105 (November 1989) and *Research Disclosure* Item 18716 (November 1979), and the locations of these disclosures are summarized in the following Table:

| Type of Additive | RD 307105 | RD 18716 |
| --- | --- | --- |
| 1. Chemical sensitizers | Page 866 | Page 648, right col. |
| 2. Speed increasing agents | | As above |
| 3. Spectral sensitizers and Super-sensitizers | Pages 866–868 | Pages 648 right col. to 649 right col. |
| 4. Whiteners | Page 868 | |
| 5. Anti-foggants and Stabilizers | Pages 868–870 | Page 649, right col. |
| 6. Light absorbers, filter dyes and UV absorbers | Pages 873–874 | Pages 649, right col. to 650, left col. |
| 7. Anti-staining agents | Page 872, right col. | Page 650, left-right cols. |
| 8. Dye image stabilizers | Page 872 | |
| 9. Film hardening agents | Pages 874–875 | Page 651, left col. |
| 10. Binders | Pages 873–874 | As above |
| 11. Plasticizers, lubricants | Page 876 | Page 650, right col. |
| 12. Coating promotors, Surfactants | Pages 875–876 | As above |
| 13. Anti-static agents | Page 876–877 | As above |

Any of the known methods can be used for the photographic processing a photosensitive material of the present invention, and known processing baths can be used. Furthermore, the processing temperature is generally selected between 18° C. to 50° C., but temperatures below 18° C. and in excess of 50° C. may be used. Either development processing wherein a silver image is formed (black and white photographic processing) or color photographic processing comprising development processing wherein a dye image is formed, can be used according to the intended purpose.

Known developing agents such as dihydroxybenzenes (for example hydroquinone), 3-pyrazolidones (for example 1-phenyl-3-pyrazolidone) and aminophenols (for example, N-methyl-p-aminophenol) can be used either individually or in combination in a black and white developer.

In general, a color developer comprises an aqueous alkaline solution which contains a color developing agent. The known primary aromatic amine developing agents, such as the phenylenediamines (for example 4-amino-N,N-diethylaniline, 3-methyl-4-amino-N,N-diethylaniline, 4-amino-N-ethyl-N-$\beta$-hydroxyethylaniline, 3-methyl-4-amino-N-ethyl-N-$\beta$-hydroxyethylaniline, 3-methyl-4-amino-N-ethyl-N-$\beta$-methanesulfonamidoethylaniline and 4-amino-3-methyl-N-ethyl-N-$\beta$-methoxyethylaniline) can be used as color developing agents.

Those disclosed, for example, by L. F. A. Mason in *Photographic Process Chemistry*, published by Focal Press, 1966, pages 226–229, and in U.S. Pat. Nos. 2,193,015 and 2,592,364, and JP-A-48-64933 can also be used.

The developer may also contain pH buffers such as alkali metal sulfites, carbonates, borates or phosphates, and development inhibitors and anti-foggants such as bromide, iodide and organic anti-foggants. It may also contain, for example, hard water softening agents, preservatives such as hydroxylamine, organic solvents such as benzyl alcohol and diethylene glycol, development accelerators such as quaternary ammonium salts and amines, dye forming couplers, competitive couplers, fogging agents such as sodium borohydride, auxiliary developing agents such as 1-phenyl-3-pyrazolidone, thickeners, the polycarboxylic acid based chelating agents disclosed in U.S. Pat. No. 4,083,723 and the antioxidants disclosed in West German Patent laid open (OLS) 2,622,950, as required.

The photographic material is generally subjected to a bleaching process after color development in cases where color photographic processing is carried out. The bleaching process may be carried out at the same time as a fixing process or it may be carried out separately. Compounds of multi-valent metals such as iron(III), cobalt(III), chromium(VI) and copper(II), peracids, quinones and nitroso compounds, for example, can be used as bleaching agents. For example, ferricyanide, dichromate, organic complex salts of iron(III) or cobalt(III), for example complex salts with aminopolycarboxylic acids such as ethylenediamine tetra-acetic acid, nitrilotriacetic acid and 1,3-diamino-2-propanol and organic acids such as citric acid, tartaric acid and malic acid can be used. Persulfate, permanganate, and nitrosophenol can also be used. Among these, potassium ferricyanide, ethylenediamine tetra-acetic acid ferric sodium salt, and ethylenediamine tetra-acetic acid ferric ammonium salt, are especially useful. Ethylenediamine tetra-acetic acid iron(III) complex salts are useful in both simple bleach baths and single bath bleach-fixers.

The bleach accelerators disclosed, for example, in U.S. Pat. Nos. 3,042,520 and 3,241,966, JP-B-45-8506 and JP-B-45-8836, the thiol compounds disclosed in JP-A-53-65732, and various other additives can also be added to the bleach or bleach-fixer.

ILLUSTRATIVE EXAMPLES

Illustrative examples are described below in order to describe the invention in more practical terms, but the invention is not limited to these examples.

EXAMPLE 1

A 0.47N aqueous silver nitrate solution (36 ml) and 36 ml of a 0.477N aqueous potassium bromide solution were added over a period of 1 minute with stirring to a reaction vessel to which 1000 ml of water, 20 grams of deionized ossein gelatin and 0.4 gram of potassium bromide had been added. The mixture was maintained at a temperature of 60° C. Next, 14 ml of 50% aqueous ammonium nitrate solution and 6 ml of 25% aqueous ammonia solution were added. After 4 minutes, 1 liter of 1.18N aqueous silver nitrate solution and 1.30N aqueous potassium bromide solution were added over a period of 50 minutes while maintaining the silver potential with respect to a saturated calomel electrode within the reaction vessel at +50 mV.

Next, a macromolecular coagulant was added and the silver bromide emulsion so obtained was precipitated, washed with water and desalted. Deionized ossein gelatin and water were added, and the pH and pAg values at 40° C. were adjusted to 6.3 and 8.5 respectively. The silver bromide grains in the above mentioned emulsion were mono-disperse cubic grains having an average side length of 0.83 $\mu$m (variation coefficient 11.7%). Sodium thiosulfate was added and the emulsion was ripened at 50° C. to provide the optimum chemical sensitization. This emulsion was divided and sensitizing dyes etc. of the present invention were added as shown in Table 1.

Next, 0.1 gram of 2-hydroxy-4,6-dichloro-1,3,5-triazine, sodium salt, and 0.1 gram of sodium dodecylbenzenesulfonate, per Kg of emulsion, were added to these emulsions. They were then coated onto a TAC film base. Moreover, an aqueous solution which had gelatin as the principal component and which contained surfactant and thickener etc. was coated over the emulsion layer to form a protective layer on these photographic materials.

The coated materials which had been prepared in this way were exposed to tungsten light (2854° K.) through an optical wedge using a blue-violet filter V-40 made by the Toshiba Glass Co., Ltd. (a band pass filter with a maximum transmittance at 400 nm and transmitting light from about 340 nm to 480 nm) and a red sharp cut filter SC-60 made by the Fuji Photo Film Co., Ltd. (a filter which transmitted light from about 600 nm). The exposed samples were developed for 7 minutes at 20° C. in a developer solution (obtained by diluting a developer having the composition indicated below two times with water), stopped, fixed, and then washed with water.

They were then subjected to density measurements using a P-type densitometer made by Fuji Photo Film Co., Ltd. to obtain the blue-violet filter photographic speed (SB), the red filter photographic speed (SR) and the fog levels. The standard point of optical density for speed measurement was (Fog +0.2). The values obtained are shown in Table 1, wherein the SB and SR results are indicated as relative values obtained by taking the value of SB of the sample taken as a standard of 100.

| Composition of the Developer | |
|---|---|
| Water | 700 ml |
| Metol | 3.1 grams |
| Anhydrous sodium sulfite | 45 grams |
| Hydroquinone | 12 grams |
| Sodium carbonate (mono-hydrate) | 79 grams |
| Potassium bromide | 1.9 grams |
| Water to make up to | 1 liter |

TABLE 1

| Sample No. | Sensitizing Dye and Amount Added × $10^{-5}$ mol/mol·Ag | | SR | SB | Fog | Remarks |
|---|---|---|---|---|---|---|
| 1-1 | — | | — | 100 (Standard) | 0.02 | |
| 1-2 | 1-4 | 1.2 | 251 | 50 | 0.02 | |
| 1-3 | | 2.4 | 263 | 35 | 0.02 | |
| 1-4 | | 4.8 | 288 | 23 | 0.02 | |
| 1-5 | 1-18 | 1.2 | 102 | 68 | 0.02 | |
| 1-6 | | 2.4 | 209 | 45 | 0.02 | |
| 1-7 | | 4.8 | 417 | 21 | 0.02 | |
| 1-8 | 1-11 | 0.3 | 120 | 46 | 0.02 | |
| 1-9 | | 0.6 | 135 | 28 | 0.02 | |
| 1-10 | | 1.2 | 76 | 18 | 0.03 | |

The novel cyanine dyes of the present invention had a good spectral sensitizing effect on the silver bromide emulsion shown in Table 1.

EXAMPLE 2

One liter of 1N aqueous silver nitrate solution and an aqueous solution of potassium bromide were added simultaneously using the CDJ method (pAg controlled double jet method) with thorough agitation to an aqueous gelatin solution which contained 0.074 mol/l of ammonia which was maintained at 60° C., maintaining a silver potential during the reaction of −40 mV. Octahedral silver bromide grains having an average grain size of 0.88 μm were formed. A copolymer of isobutene and maleic acid mono-sodium salt, was added to the above mentioned emulsion. The emulsion was precipitated and washed with water. The emulsion was then desalted and 95 grams of deionized ossein gelatin and 430 ml of water were added. The pH and pAg values at 50° C. were adjusted to 6.4 and 8.4 respectively.

Next, the emulsion was divided and cyanine dyes relating to the present invention were added at 70° C. as shown in Table 2. After stirring for 30 minutes, the temperature was reduced to 60° C. Optimal quantities of an aqueous solution of sodium thiosulfate and then a mixed solution of potassium chloroaurate and potassium thiocyanate were added. The emulsions were ripened to provide the optimum speeds.

Next, 18 mg of 4-hydroxy-6-methyl-1,3,3a,7-tetraazaindene, 28 grams of a 10% deionized gelatin gel and 104 ml of water were added per 100 grams of the emulsion at 40° C. The emulsions were coated in the way described below onto a poly(ethylene terephthalate) film base.

The amount of coating liquid was set so that the coated weights of silver and gelatin were 2.5 g/m² and 3.8 g/m² respectively. An aqueous solution which contained 0.22 g/l of sodium dodecylbenzenesulfonate, 0.50 g/l of p-sulfostyrene, sodium salt, homopolymer, 3.1 g/l of 2,4-dichloro-6-hydroxy-1,3,5-triazine, sodium salt, and 50 g/l of gelatin as the principal components, was coated at the same time over this layer to provide a coated gelatin weight of 1.0 g/m².

These samples were each exposed for $10^{-6}$ second using a xenon light source through a continuous wedge, using the same blue violet color band pass filter V-40 and red sharp cut filter SC-68 made by the Fuji Photo Film Co., Ltd. (a filter transmitting wavelengths longer than about 680 nm) as used in Example 1.

After exposure, the samples were developed for 10 minutes at 20° C. using a developer having the composition indicated below. The developed films were subjected to density measurements using a densitometer made by the Fuji Photo Film Co., Ltd. The red filter photographic speeds (SR), blue violet filter photographic speeds (SB) and the fog levels were obtained. The standard point of optical density for determining photographic speed was (Fog +0.2). Moreover, SR and SB are shown in Table 2 as relative values obtained under the above mentioned exposure conditions taking the blue violet filter photographic speed of a sample to which no cyanine dye had been added to be 100.

| Composition of the Developer | |
|---|---|
| Metol | 2.5 grams |
| α-Ascorbic acid | 10.0 grams |
| Potassium bromide | 1.0 gram |
| Nabox | 35.0 grams |
| Water to make up to | 1 liter (pH 9.8) |

TABLE 2

| Sample No. | Sensitizing Dye and Amount Added × $10^{-5}$ mol/mol·Ag | | SB | SR | Fog | Remarks |
|---|---|---|---|---|---|---|
| 2-1 | — | | 100 (Standard) | — | 0.03 | |
| 2-2 | 1-4 | 0.71 | 38 | 37 | 0.03 | |
| 2-3 | | 1.42 | 23 | 59 | 0.03 | |
| 2-4 | | 2.13 | 15 | 42 | 0.04 | |

TABLE 2-continued

| Sample No. | Sensitizing Dye and Amount Added × $10^{-5}$ mol/mol·Ag | SB | SR | Fog | Remarks |
|---|---|---|---|---|---|
| 2-5 | 2.84 | 7 | 11 | 0.05 | |

The cyanine dye 1-4 used is the same as the dye used in Example 1. In comparison to Samples 1-2 and 1-4 in Example 1, SR is not so high but it appears that there is a step forward in the spectral sensitizing properties. Moreover, unlike in Example 1, here J-aggregates are formed and it is this realized J-band sensitization which gives a so-called sharp spectral sensitization distribution. J-band sensitization sensitizes the prescribed wavelength region and had a further advantage of not increasing very much the sensitivity in unwanted wavelength regions. This is known to be useful for providing a degree of freedom in the selection of safelight colors and for preventing the occurrence of color mixing in color photosensitive material design. The reflective absorption spectrum of sample number 2-3 of this Example is shown in FIG. 1 and the spectral sensitization distribution spectrum is shown in FIG. 2. Dyes with which J-band sensitization is realized in the long wavelength region are very rare.

The cyanine dyes of the present invention can provide both J-band sensitization and M-band sensitization by suitable adjustment of the amount added and the addition temperature. Of course, spectral sensitivity can also be provided in an embodiment wherein both J-band sensitization and M-band sensitization are combined in those cases where spectral sensitization over a wide wavelength region is desired.

EXAMPLE 3

The silver halide emulsion (1) used in Example 3 was prepared in the way indicated below.

| | |
|---|---|
| Solution 1 | |
| H$_2$O | 1000 cc |
| NaCl | 5.5 grams |
| Gelatin | 32 grams |
| Solution 2 | |
| Sulfuric acid (1N) | 24 cc |
| Solution 3 | |
| The Silver halide solvent indicated below (1%) | 3 cc |

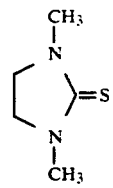

| | |
|---|---|
| Solution 4 | |
| KBr | 0.22 gram |
| NaCl | 10.89 grams |
| H$_2$O to make up to | 200 cc |
| Solution 5 | |
| AgNO$_3$ | 32 grams |
| H$_2$O to make up to | 200 cc |
| Solution 6 | |
| KBr | 0.90 gram |
| NaCl | 43.61 grams |
| K$_2$IrCl$_6$ (0.001%) | 4.54 cc |
| H$_2$O to make up to | 600 cc |
| Solution 7 | |
| AgNO$_3$ | 128 grams |

| | |
|---|---|
| H$_2$O to make up to | 600 cc |

Solution 1 was heated to 56° C. and Solutions 2 and 3 were added. Subsequently, Solutions 4 and 5 were added simultaneously over a period of 8 minutes. After a further period of 10 minutes, Solutions 6 and 7 were added simultaneously over a period of 20 minutes. Five minutes after this addition, the temperature was reduced and a copolymer of isobutene and maleic acid, mono-sodium salt, was added as a coagulating agent. The emulsion was precipitated, washed with water and de-salted. Water and dispersed gelatin were added, the pH was adjusted to 6.2, and the pAg was adjusted to 7.4. A mono-disperse cubic silver chlorobromide emulsion which contained 1 mol.% of silver bromide having an average grain size of 0.45 μm and a variation coefficient (the value obtained by dividing the standard deviation by the average grain size, s/d) of 0.08 was obtained. Chloroauric acid was added to the emulsion in an amount of $1.0 \times 10^{-4}$ mol/mol.Ag. Then sodium thiosulfate was added and optimal chemical sensitization was carried out.

Next, a pure silver chloride Emulsion (2) which had a silver chloride content of 100% was prepared in a similar manner, except that the KBr was excluded from Solutions 4 and 6 and the amounts of NaCl in Solutions 4 and 6 were changed to 110.00 grams and 4.05 grams respectively.

This pure silver chloride emulsion comprised monodisperse cubic grains having an average grain size of 0.45 μm, variation coefficient 0.09. The pH was adjusted to 6.2 and the pAg was adjusted to 7.4.

Next, 11.5 ml of ethyl acetate and 7.7 ml of Solvent (c) were added to 10.0 grams of the Cyan Coupler (a) and 5.6 grams of the Colored Image Stabilizer (6) to form a solution which was subsequently emulsified and dispersed in 150 ml of a 10% aqueous gelatin solution which contained 10 ml of 10% sodium dodecylbenzenesulfonate.

The compounds shown in Table 3 were added at 40° C. to Emulsion (1) or (2) which had been prepared beforehand and, after 20 minutes, the aforementioned emulsified dispersion and $3.0 \times 10^{-4}$ mol/mol.Ag of 1-(3-acetylaminophenyl)-5-mercaptotetrazole were added as an anti-foggant. Samples were prepared as shown in Table 3.

Moreover, the known Cyanine Dye (b) shown as a Comparative Example in the Table is a dye which provides spectral sensitization to more or less the same wavelength region as the compounds shown in Table 3.

A paper support which had been laminated on both sides with polyethylene was used as a support. The emulsions were coated on the support to provide a silver coated weight of 0.35 g/m², a coupler coated weight of 0.45 g/m² and a gelatin coated weight of 1.50 g/m². A protective layer of 1.50 g/m² of gelatin was placed over this layer. Furthermore, 2-hydroxy-4,6-dichloro-1,3,5-triazine, sodium salt, was used as a gelatin hardening agent in each layer.

Cyan Coupler (a)

-continued

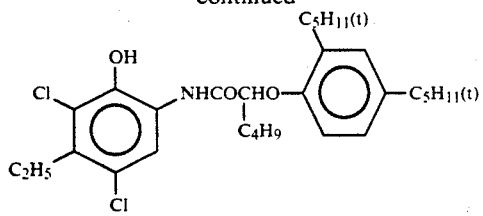

Solvent (c)
A 2:1 mixture (by weight) of dibutylphthalate and tri(n-nonylphosphate)

Colored Image Stabilizer (6)
A 2:4:4 mixture (by weight) of

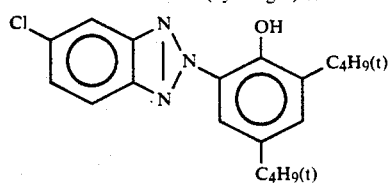

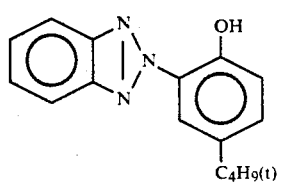

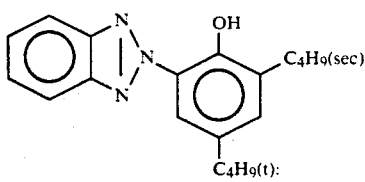

The aforementioned samples were exposed for a short interval using a He-Ne gas laser light (632.8 nm). The samples which had been set on a rotating polyhedron were also moved in a direction perpendicular to the scanning direction of the laser light during the exposure and a scanning graded exposure was provided by means of apparatus with which the exposure rate could be varied optically.

The exposed samples were color developed via the processing conditions outlined below using a paper processor.

| Process | Processing Operations (Finisher: Delete this heading) | | | |
|---|---|---|---|---|
| | Processing Temp. | Processing Time | Replenishment Rate* | Tank Capacity |
| Color development | 35° C. | 45 seconds | 161 ml | 17 liters |

| Process | Processing Operations (Finisher: Delete this heading) | | | |
|---|---|---|---|---|
| | Processing Temp. | Processing Time | Replenishment Rate* | Tank Capacity |
| Bleach-fix | 30–35° C. | 45 seconds | 215 ml | 17 liters |
| Rinse (1) | 30–35° C. | 20 seconds | — | 10 liters |
| Rinse (2) | 30–35° C. | 20 seconds | — | 10 liters |
| Rinse (3) | 30–35° C. | 20 seconds | 350 ml | 10 liters |
| Drying | 70–80° C. | 60 seconds | | |

*Replenishment rate per square meter of photosensitive material (A three tank count-flow system from rinse (3) to rinse (1))

The composition of each processing bath is indicated below:

| | Tank Solution | Replenisher |
|---|---|---|
| Color Developer | | |
| Water | 800 ml | 800 ml |
| Ethylenediamine N,N,N,N-tetramethylenephosphonic acid | 1.5 grams | 2.0 grams |
| Triethanolamine | 8.0 grams | 12.0 grams |
| Sodium chloride | 1.4 grams | — |
| Potassium carbonate | 25 grams | 25 grams |
| N-Ethyl-N-(β-methanesulfonamido-ethyl)-3-methyl-4-aminoaniline sulfate | 5.0 grams | 7.0 grams |
| N,N-Bis(carboxymethyl)hydrazine | 5.5 grams | 7.0 grams |
| Fluorescent whitener (WHITEX 4B, made by Sumitomo Chemicals) | 1.0 gram | 2.0 grams |
| Water to make up to | 1000 ml | 1000 ml |
| pH (25° C.) | 10.05 | 10.45 |
| Bleach-fixer (Tank Solution = Replenisher) | | |
| Water | 400 ml | |
| Ammonium thiosulfate (70%) | 100 ml | |
| Sodium sulfite | 17 grams | |
| Ethylenediamine tetra-acetic acid, iron(III) ammonium salt | 55 grams | |
| Ethylenediamine tetra-acetic acid, di-sodium salt | 5 grams | |
| Ammonium Bromide | 40 grams | |
| Water to make up to | 1000 ml | |
| pH (25° C.) | 6.0 | |
| Rinse Bath (Tank Solution = Replenisher) | | |
| Ion exchanged water (calcium and magnesium both 3 ppm or less) | | |

The evaluation of photographic properties was carried out in the way indicated below.

The cyan color density was measured through a rad filter using a densitometer made by the Fuji Photo Film Co., Ltd. and the fog levels and relative speeds were obtained. The standard point of optical density for the determination of photographic speed was (Fog +0.5). The relative speeds are indicated as relative values obtained by taking the speed of the sample to which the smallest amount of the Comparative Compound (b) had been added to the same emulsion to be 100.

It is clear from the results shown in Table 3 that the novel cyan dyes of the present invention have good spectral sensitization properties.

TABLE 3

| Sample No. | Emulsion | Sensitizing Dye and Amount Added × $10^{-5}$ mol/mol · Ag | | Relative Speed | Fog | Remarks |
|---|---|---|---|---|---|---|
| 3-1 | (1) | (b) | 2.2 | 100 (standard) | 0.12 | Comp. Ex. |
| 3-2 | | | 4.4 | 112 | 0.16 | |
| 3-3 | | | 8.8 | 110 | 0.17 | |
| 3-4 | (1) | 1-4 | 2.2 | 209 | 0.09 | Invention |
| 3-5 | | | 4.4 | 224 | 0.09 | |
| 3-6 | | | 8.8 | 218 | 0.11 | |
| 3-7 | (1) | 1-13 | 2.2 | 186 | 0.11 | Invention |
| 3-8 | | | 4.4 | 204 | 0.11 | |

TABLE 3-continued

| Sample No. | Emulsion | Sensitizing Dye and Amount Added × $10^{-5}$ mol/mol · Ag | | Relative Speed | Fog | Remarks |
|---|---|---|---|---|---|---|
| 3-9 | | | 8.8 | 209 | 0.12 | |
| 3-10 | (2) | (b) | 2.2 | 100 (standard) | 0.13 | Comp. Ex. |
| 3-11 | | | 4.4 | 110 | 0.15 | |
| 3-12 | | | 8.8 | 105 | 0.18 | |
| 3-13 | (2) | I-4 | 2.2 | 156 | 0.10 | Invention |
| 3-14 | | | 4.4 | 191 | 0.10 | |
| 3-15 | | | 8.8 | 200 | 0.12 | |
| 3-16 | (2) | I-14 | 2.2 | 204 | 0.12 | Invention |
| 3-17 | | | 4.4 | 208 | 0.13 | |
| 3-18 | | | 8.8 | 174 | 0.13 | |

Comparative Compound (b)

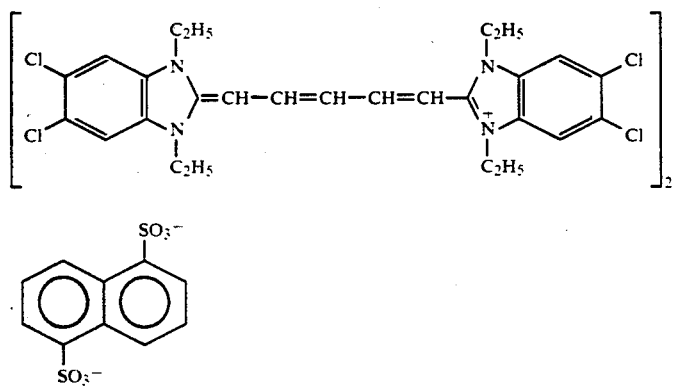

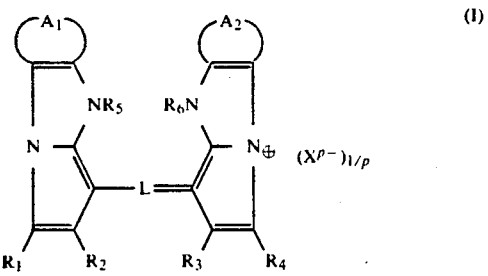

What is claimed is:

1. A silver halide photographic material, comprising a support having thereon a layer which contains a compound represented by the following general formula (I):

(I)

wherein $A_1$ and $A_2$ each represents groups of atoms which are required to complete aromatic rings, which may be substituted or unsubstituted; $R_1$, $R_2$, $R_3$ and $R_4$ each independently represents a hydrogen atom, an alkyl group, an alkenyl group, a phenyl group, a five- or six-membered heterocyclic group, an acyl group or an alkoxy group, which may be substituted or unsubstituted; $R_5$ and $R_6$ each independently represents an alkyl group, a phenyl group, a naphthyl group or a five- or six-membered heterocyclic group, which may be substituted or unsubstituted; X represents a p-valent anion; p represents 1, 2 or 3; L represents a methine group which may be substituted or unsubstituted, or a trivalent linking group wherein three, five or seven methine groups are linked by conjugated double bonds; and X may be bonded to $A_1$, $A_2$, $R_1$ to $R_6$ or L to form an intramolecular salt.

2. The silver halide photographic material of claim 1, wherein $R_1$, $R_2$, $R_3$ and $R_4$ each represents a substituted or unsubstituted alkyl group having 1 to 18 carbon atoms, a substituted or unsubstituted phenyl group having 6 to 18 carbon atoms, or a substituted or unsubstituted naphthyl group having 10 to 18 carbon atoms.

3. The silver halide photographic material of claim 1, wherein $R_5$ and $R_6$ each represents a substituted or unsubstituted alkyl group having 1 to 18 carbon atoms, a substituted or unsubstituted phenyl group having 6 to 18 carbon atoms, or a substituted or unsubstituted naphthyl group having 10 to 18 carbon atoms.

4. The silver halide photographic material of claim 1, wherein $A_1$ and $A_2$ each represents a substituted or unsubstituted benzene ring or a substituted or unsubstituted naphthalene ring.

5. The silver halide photographic material of claim 1, wherein L represents a trivalent linking group wherein three or five methine groups are linked by conjugated double bonds.

6. The silver halide photographic material of claim 1, wherein the compound represented by general formula (I) is contained in a negative emulsion, and wherein the substituent groups on R to $R_4$, A and $A_2$ have a Hammett $\sigma$-value of not more than 0.6.

7. The silver halide photographic material of claim 1, wherein the compound represented by general formula (I) is contained in an emulsion which contains pre-fogged nuclei, and wherein the substituent groups on $R_1$ to $R_4$, $A_1$ and $A_2$ have a Hammett $\sigma$-value of more than 0.6.

8. The silver halide photographic material of claim 1, wherein the amount of the compound represented by general formula (I) is $1 \times 10^{-6}$ to $1 \times 10^{-3}$ mol per 1 mol of silver halide.

* * * * *